Nov. 6, 1934.　　M. J. HORKAVI　　1,980,057
DISPENSING APPARATUS
Filed Jan. 15, 1934　　2 Sheets-Sheet 1
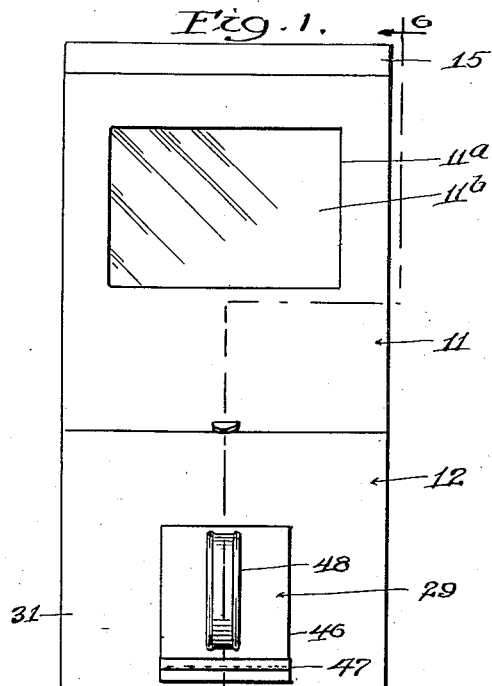
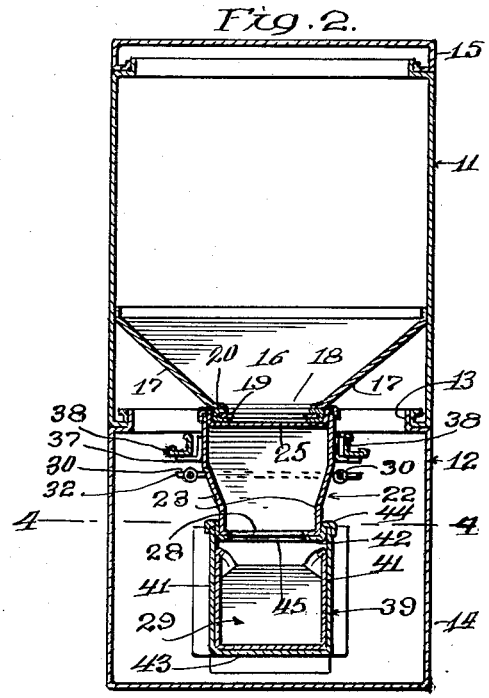
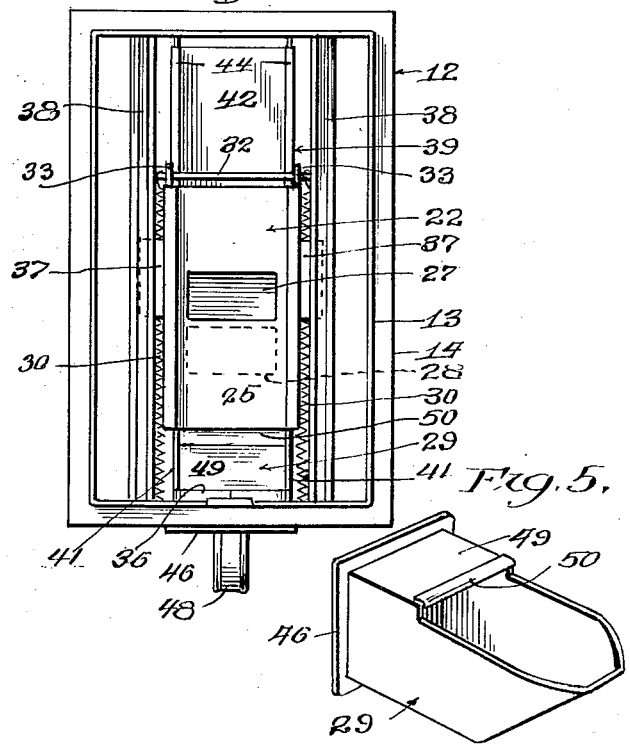
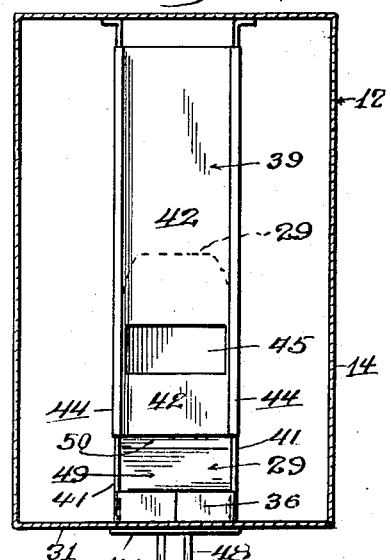
INVENTOR.
Michael J. Horkavi,
BY
Charles Q. Hurvey
ATTORNEY.

Nov. 6, 1934.　　　M. J. HORKAVI　　　1,980,057
DISPENSING APPARATUS
Filed Jan. 15, 1934　　　2 Sheets-Sheet 2
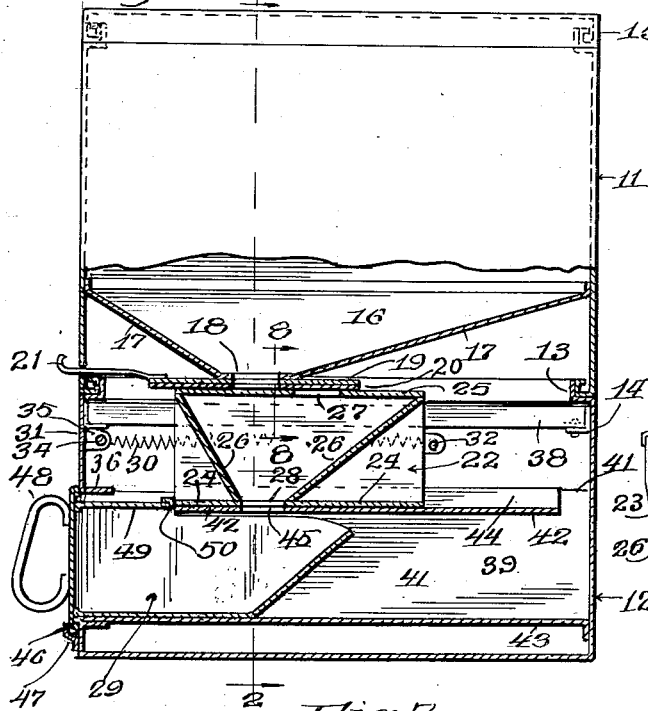
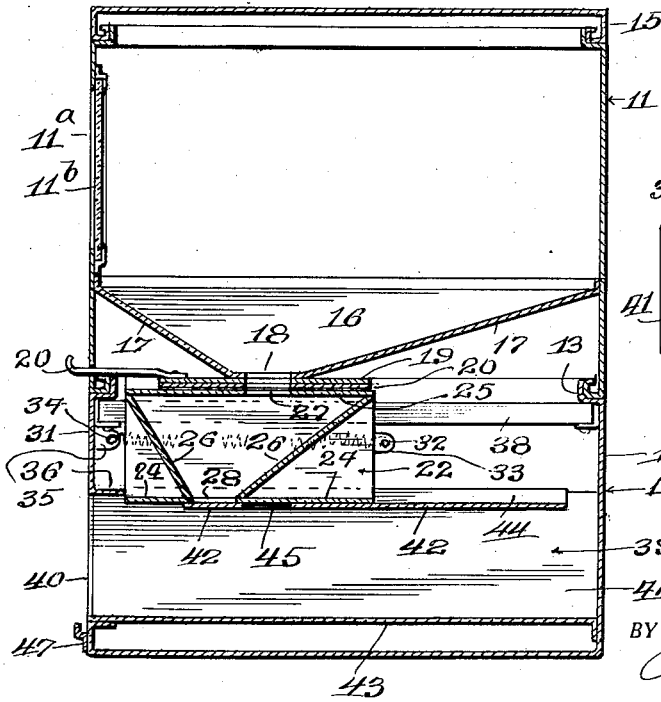
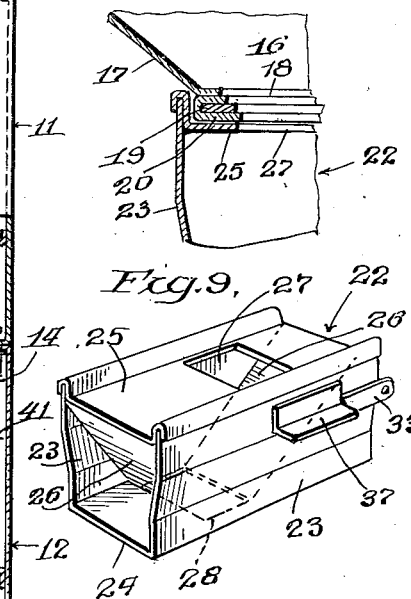
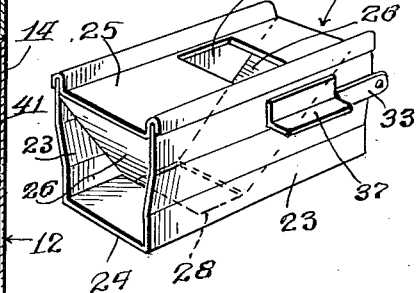
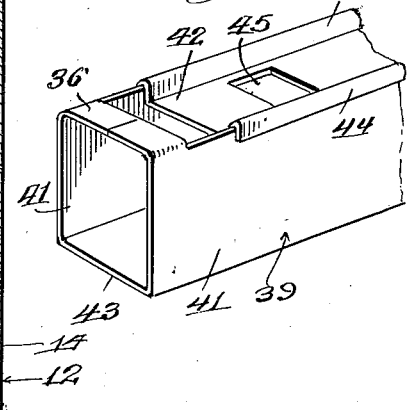
INVENTOR.
Michael J. Horkavi,
BY
Charles O. Sherry
ATTORNEY.

Patented Nov. 6, 1934

1,980,057

UNITED STATES PATENT OFFICE 1,980,057

DISPENSING APPARATUS

Michael J. Horkavi, Gary, Ind., assignor of one-half to William L. Evans, Gary, Ind.

Application January 15, 1934, Serial No. 706,633

11 Claims. (Cl. 221—104)

This invention relates to dispensing apparatus, and its principal object is to provide a simple and comparatively inexpensive device for delivering accurately measured portions of free flowing solids such as coffee, beans, rice, sugar and the like.

Another object is to provide measuring means of novel construction, combined with a scoop to receive the measured portion, whereby the attendant may readily withdraw the filled scoop from the device and place the measured portion in a bag or other container.

The invention consists in the several novel features of construction, arrangement and combination of parts, hereinafter fully set forth and claimed.

The invention is clearly illustrated in the accompanying drawings in which:

Fig. 1 is a front elevation of a dispensing apparatus embodying a simple form of the present invention;

Fig. 2 is a vertical cross-section thereof taken on the line 2—2 of Fig. 6;

Fig. 3 is a plan with the reservoir part of the apparatus removed;

Fig. 4 is a horizontal section taken on the line 4—4 of Fig. 2, with the measuring receptacle omitted;

Fig. 5 is a perspective view of the scoop;

Fig. 6 is a view partly in side elevation and partly in vertical longitudinal section taken on the line 6—6 of Fig. 1;

Fig. 7 is a view similar to Fig. 6, but showing the scoop removed;

Fig. 8 is a detail cross-section taken on the line 8—8 of Fig. 6;

Fig. 9 is a perspective view of the measuring receptacle, and

Fig. 10 is a perspective view partly broken away of the slideway for the scoop.

Referring to said drawings, which illustrate a simple form of the invention, the reference character 11 designates the reservoir or container for the commodity to be dispensed, and 12 designates the measuring member of the apparatus. The upper end of the case 14 of the measuring member is provided with a neck 13 which leaves a shoulder upon which the reservoir rests. The reservoir is likewise provided with a neck and shoulder to receive a cover 15.

In the lower part of the reservoir is a hopper 16 formed by inclined walls 17 that converge toward a common place, where the hopper is provided with a discharge opening 18. For temporarily closing said opening, a slide 19 is provided which is slidably supported by a plate 20 the side edges of which are soldered or otherwise secured to the bottom of the hopper. The side edges of the plate 20 are bent over to provide guide grooves for the slide (see Fig. 8). The slide and plate are formed with openings that register with the discharge opening in the hopper whereby the contents may freely discharge therefrom. A handle 21 secured to the slide and extending out through an end wall of the reservoir provides means for moving the slide forwards and backwards to close and open the discharge opening in the hopper. Normally the slide is held in open position, but in case it is desired to lift the reservoir from the measuring member, when filled or partly filled, the slide may be drawn forward to close the discharge opening. Desirably an opening $11^a$ is formed in the front wall of the reservoir, which is covered by a glass plate $11^b$ through which the contents of the reservoir are visible.

Slidably supported in the casing 14 of the measuring member of the apparatus, is a measuring receptacle 22 (see Fig. 9) into which a portion of the contents of the reservoir may discharge and thereby load the measuring receptacle with the predetermined amount of the commodity to be dispensed. The measuring receptacle is generally rectangular in form, having two sides 23, a bottom 24, a top 25 slightly depressed below the top edges of the sides, and inclined end walls 26. In the top 25 is a rectangular inlet opening 27 and in the bottom 24 is a rectangular outlet opening 28. Desirably the inlet opening 27 is located farther back than the outlet opening 28 and the inclined end walls join the bottom at the marginal edges of the outlet opening. When the scoop (seen at 29) has been withdrawn from the measuring member, the inlet opening 27 registers with the discharge opening 18 of the hopper (see Fig. 7) thereby permitting part of the contents of the reservoir to discharge into the measuring receptacle. This is the loading position of the measuring receptacle. The capacity of the measuring receptacle is proportioned to contain the predetermined quantity to be measured.

The measuring receptacle is yieldably held in the loading position seen in Fig. 7 by a pair of coiled tension springs 30 secured to the measuring receptacle and to the front wall 31 of the casing 14. Conveniently a rod 32 is secured to the rear end of the measuring receptacle by ears 33, and a rod 34 is secured to the front wall 31 by ears 35, and the ends of the springs engage over said rods. A stop 36 adjacent the front wall 31 limits the forward movement of the measuring receptacle caused by the springs and thereby locates the inlet opening of the measuring receptacle in register with the discharge opening in the hopper. Desirably side flanges 37 are provided on the measuring receptacle which engage with the undersides of two guide rails here shown in the form of angle bars 38 that extend from front to back of the casing 14 and are secured to the front and back walls thereof. The guide rails 38 and flanges 37 prevent the measuring receptacle from becoming displaced.

Below and forming a support for the measuring receptacle 22 is a rectangular guideway 39 which extends from front to back of the casing 14 and opens out through an opening 40 in the front wall 31. The guideway 39 comprises side walls 41, a slightly depressed top wall 42 and a bottom wall 43. The side walls 41 extend slightly above the top wall and the edge portions of the top wall are bent over the upper edges of the side walls to provide side flanges 44 that serve as guides for the measuring receptacle, the latter resting and sliding on the top wall 42, and being guided for its forward and backward movement between the side flanges 44. The guideway is secured to and carried by the front and rear walls of the casing 14.

The top wall 42 of the guideway 39 extends forwards to a point below the front edge of the measuring receptacle (when in its unloading position as seen in Fig. 6) and said top wall has an opening 45 therein which registers with the outlet opening 28 of the measuring receptacle when the latter occupies the unloading position as seen in Fig. 6, that is to say whenever the scoop is in place in the guideway, thereby permitting the measured contents of the measuring receptacle to discharge into the scoop.

The scoop is of substantially rectangular form, and when fully inserted into the guideway, stands underneath the opening 45 in the top wall of the guideway. A flange 46 on the end wall of the scoop is arranged to encounter the front wall 31 of the casing 14 when the scoop has been fully inserted and a flange 47 on said front wall is arranged to engage over the flange 46 of the scoop to hold it in place in the guideway. A handle 48 on the end wall of the scoop furnishes convenient means for handling the scoop. The scoop is released from the flange 47 by raising the scoop slightly.

The scoop has a top wall 49 which partly covers the open top of the scoop and the edge 50 of said top wall is arranged to encounter the front edge of the bottom wall 24 of the measuring receptacle 22, when being inserted into the guideway. With this arrangement the scoop serves to move the measuring receptacle back against the action of the springs from the position seen in Fig. 7 to that seen in Fig. 6.

In operation the reservoir is filled with the commodity which is to be dispensed, and with the parts in the loading position seen in Fig. 7, a portion of the contents discharge through the registering openings 18, 27 into the measuring receptacle 22. In this position the scoop has been withdrawn and the outlet opening 28 of the measuring receptacle is closed by the top wall 42 of the guideway 39. A measured quantity of the commodity is now contained in the measuring receptacle.

The scoop is inserted into the guideway and as it is moved back, the edge 50 of the scoop encounters the front edge of the measuring receptacle and moves it back to the unloading position seen in Fig. 6 when the scoop has been fully inserted. To lock the scoop in place it is lifted slightly to bring its flange 46 over the upper edge of the flange 47 and then lowered to bring the flange of the scoop behind the flange 47. In this position a part of the top wall 25 of the measuring receptacle closes the discharge opening 18 of the reservoir (see Fig. 6), while the opening 28 in the bottom of the measuring receptacle and the opening 45 in the top wall of the guideway are in register, permitting the measured contents of the measuring receptacle to discharge into the scoop.

As the scoop is being withdrawn to dispose of the measured portion, the springs 30 force the measuring receptacle back to the position seen in Fig. 7, thereby closing the outlet opening 28 in the measuring receptacle and again registering the openings 18, 27 between the reservoir and measuring receptacle and the latter is again loaded from the reservoir.

I claim as new and desire to secure by Letters Patent:

1. In dispensing apparatus, the combination of a case, having a guideway therein, a reservoir above the case, having a discharge opening, a reciprocatory, spring actuated measuring receptacle in the case, below the reservoir, a horizontal wall below the measuring receptacle, having an opening therein, and a removable scoop having a top wall adapted when the scoop is inserted into the guideway, to encounter and move said measuring receptacle, said scoop being arranged to stand beneath the opening in said horizontal wall, said measuring receptacle having an inlet opening in its top wall adapted to register with the discharge opening in the reservoir when the scoop is withdrawn, and said measuring receptacle having an outlet opening in its bottom adapted to register with the opening in said horizontal wall when the scoop is inserted and the measuring receptacle is moved back.

2. In dispensing apparatus, the combination of a reservoir having a discharge opening, a reciprocatory spring actuated measuring receptacle having a top wall arranged to close said discharge opening when in one position, said receptacle having an inlet opening in its top wall adapted to register with said discharge opening when the measuring receptacle occupies another position, there being an outlet opening in the bottom of the measuring receptacle, a guideway below said measuring receptacle, a removable scoop therein having a top wall arranged to engage and move said measuring receptacle against the action of the spring, and a horizontal wall between the measuring receptacle and scoop arranged to cover the outlet opening of the measuring receptacle when occupying said other position, said horizontal wall having an opening, and the top wall of said scoop being arranged to encounter said measuring receptacle when inserted under the latter and thereby move the measuring receptacle into a position closing the discharge opening in the reservoir, and registering the outlet opening in the measuring receptacle and opening in the horizontal wall.

3. In dispensing apparatus, the combination of a reservoir having a discharge opening, a reciprocatory measuring receptacle, coiled tension springs for moving the measuring receptacle, in one direction, a scoop having a top wall adapted to engage and move the measuring receptacle in the opposite direction and a guideway for receiving the scoop, said reservoir and measuring receptacle having openings adapted to register with each other, when the scoop is withdrawn, and said measuring receptacle and guideway having openings adapted to register when the measuring receptacle is moved back by the scoop, said last mentioned openings being located over the scoop.

4. In dispensing apparatus the combination of a reservoir having a discharge opening, a reciprocatory measuring receptacle, having an inlet opening and an outlet opening, yieldable means for moving the measuring receptacle to a loading position, a horizontal wall below the measuring receptacle, arranged to close the outlet opening of the measuring receptacle when in its loading position, said horizontal wall having an opening adapted to register with said outlet when the measuring receptacle occupies an unloading position, a guideway and a removable slidably guided scoop therein having a top wall arranged to engage and move the measuring receptacle from its loading position, in which the openings between the reservoir and measuring receptacle are in register, to its unloading position in which the openings between the measuring receptacle and horizontal wall are in register.

5. In dispensing apparatus, the combination of a movable reciprocatory measuring receptacle, coiled springs adapted to move said measuring receptacle to its loading position, a guideway below the measuring receptacle, and a slidably supported scoop therein having a top wall arranged to engage and move said measuring receptacle to its unloading position.

6. In dispensing apparatus a slidably mounted measuring receptacle having a loading position and an unloading position, yieldable means to move said measuring receptacle to its loading position, a guideway below the measuring receptacle, and a slidably supported scoop arranged therein having a top wall to engage and move the measuring receptacle to its unloading position.

7. In dispensing apparatus, the combination of a measuring member, having a reciprocatory measuring receptacle therein, a guideway below the measuring receptacle, and a removable scoop in the guideway into which the measured contents of the measuring receptacle are discharged, and a reservoir removably supported on said measuring member and arranged to discharge into said measuring receptacle.

8. In dispensing apparatus, the combination of a reservoir having a discharge opening, a case under said reservoir, a guideway supported in said case, a measuring receptacle slidably supported on a top wall of said guideway, and a removable scoop insertable into said guideway, and yieldable means to move the measuring receptacle into a loading position in communication with the reservoir and out of communication with the scoop, the latter having a top wall arranged to engage and move the measuring receptacle into unloading position, out of communication with the reservoir and in communication with the scoop.

9. In dispensing apparatus the combination of a case, a guideway and guide rails supported therein, a measuring receptacle guided for lengthwise movement along said guideway and guide rails, coiled springs to move said measuring receptacle to a loading position, a scoop removably supported in said guideway and arranged to engage and move the measuring receptacle against the action of said springs to an unloading position, and means to lock said scoop against the action of said springs.

10. In dispensing apparatus the combination with a reservoir having a discharge opening and a slide for controlling said opening, of a measuring member case detachably connected to said reservoir, a measuring receptacle in said case having a loading and an unloading position and a scoop insertable into said case below the measuring receptacle and having a top wall engageable with said measuring receptacle, to move the latter into unloading position.

11. In dispensing apparatus, a case having a reservoir containing a discharge opening, a reciprocatory closure underneath said discharge opening for covering and uncovering said opening, springs for holding said closure in one position, a scoop insertible into said case below said closure and having a part arranged to encounter and move the closure back against the action of the spring, and co-acting means on the case and scoop to hold the latter in the case against the action of the spring.

MICHAEL J. HORKAVI.